United States Patent [19]
Park

[11] Patent Number: 6,128,055
[45] Date of Patent: Oct. 3, 2000

[54] REFLECTIVE DISPLAY APPARATUS USING COMPENSATOR CELL AND FERROELECTRIC LIQUID CRYSTAL AT 90° TO ENHANCE CONTRAST RATIO

[75] Inventor: Joon-Chan Park, Seoul, Rep. of Korea

[73] Assignee: Samsung Electronics Co., Ltd., Kyungki-do, Rep. of Korea

[21] Appl. No.: 09/487,290

[22] Filed: Jan. 19, 2000

[30] Foreign Application Priority Data

Jan. 20, 1999 [KR] Rep. of Korea .................. 99-1709

[51] Int. Cl.[7] .................................................. G02F 1/1347
[52] U.S. Cl. ........................... 349/77; 349/9; 349/81
[58] Field of Search ................................ 349/9, 77, 81

[56] References Cited

U.S. PATENT DOCUMENTS

| | | | |
|---|---|---|---|
| 4,343,535 | 8/1982 | Bleha, Jr. ........................... | 350/342 |
| 5,924,783 | 7/1999 | Jones ................................. | 353/97 |
| 5,936,697 | 8/1999 | Yang .................................. | 349/180 |
| 5,959,773 | 9/1999 | Gagnon ............................. | 359/495 |
| 5,986,815 | 11/1999 | Bryars ............................... | 359/634 |
| 6,016,173 | 1/2000 | Crandall ............................ | 349/25 |

*Primary Examiner*—Kenneth Parker
*Assistant Examiner*—Mike Qi
*Attorney, Agent, or Firm*—Sughrue, Mion, Zinn, Macpeak & Seas, PLLC

[57] ABSTRACT

A reflective display apparatus enhancing a contrast ratio does not use a quarter wavelength plate and adjusts a switching angle of each molecular axis of a compensator and a ferroelectric liquid crystal (FLC) display device, to thereby enhance a contrast ratio. The reflective display apparatus is used for manufacturing an FLC projection TV using a polarizing beam splitter (PBS).

7 Claims, 4 Drawing Sheets

PROJECTION LENS

REFLECTIVE DISPLAY APPARATUS USING COMPENSATOR CELL AND FERROELECTRIC LIQUID CRYSTAL AT 90° TO ENHANCE CONTRAST RATIO

BACKGROUND OF THE INVENTION

1. Field of the Invention

The present invention relates to a reflective display apparatus using a polarizing beam splitter (PBS), and more particularly, to a reflective display apparatus enhancing a contrast ratio by controlling a switching angle with respect to each molecular axis of a compensator and ferroelectric liquid crystal display device.

2. Description of the Related Art

A contrast ratio is a scale representing how definitely an image is viewed. An image is viewed better as a difference in luminance is greater. The contrast ratio is a value which is obtained by dividing a luminance value of the white state by that of the black state at the center of a panel. The luminance of the black state has a value smaller than that of the white state. Thus, it can be seen that the contrast ratio is influenced more by the luminance of the black state. Finally, the contrast ratio becomes higher as the luminance value of the black state is smaller.

FIG. 1 is a schematic diagram showing a configuration of a conventional reflective display apparatus using a PBS.

In FIG. 1, a P polarized beam of a beam incident to a polarizing beam splitter (PBS) 11 transmits through the PBS 11 and an S polarized beam reflects from the PBS 11. The beam having transmitted through the PBS 11 proceeds to a quarter wavelength plate 12. The beam having proceeded to the quarter wavelength plate 12 is converted into a circular polarized beam in the quarter wavelength plate 12 and then proceeds to a compensator 13. The beam having proceeded to the compensator 13 is converted into a linear polarized beam in the compensator 13 and then proceeds to a ferroelectric liquid crystal (FLC) display device 14. The beam incident to the FLC display device 14 is converted into a circular polarized beam in the FLC display device 14 and then reflected from the FLC display device 14. The reflected beam is converted into a linear polarized beam in the FLC display device 14 and proceeds to the compensator 13. The beam having proceeded to the compensator 13 is converted into a circular polarized beam in the compensator 13 and then proceeds to the quarter wavelength plate 12. The beam incident to the quarter wavelength plate 12 is converted into a linear polarized beam in the quarter wavelength plate 12 and then proceeds to the PBS 11. In the beam proceeding from the quarter wavelength plate 12 to the PBS 11, a P polarized beam transmits through the PBS 11 and an S polarized beam reflects from the PBS 11 to proceed to a projection lens.

In FIG. 1, the compensator 13 is made of the same material as that of the FLC display device 14. The compensator 13 converts the polarized beam of the incident beam. The molecular axis of each pixel of the compensator 13 is aligned in the disorder state when a driving voltage is not applied thereto. The molecular axis of each pixel of the compensator 13 is aligned in any one direction of 0° direction and +45° direction based on a vertical axis according to an applied driving voltage. The compensator 13 looks as if the whole compensator 13 is made of a single pixel when a molecular axis of each pixel is aligned in the same direction. An angle where a molecular axis is aligned to be 0° or +45° is called a switching angle (referring to FIG. 2A).

In FIG. 1, the FLC display device 14 is a reflective liquid crystal display device and converts a polarized beam of the incident beam. The molecular axis of each pixel of the FLC display device 14 is aligned in the disorder state when a driving voltage is not applied thereto. The molecular axis of each pixel of the FLC display device 14 is aligned in any one direction of 0° direction and −45° direction based on a horizontal axis according to an applied driving voltage. An angle where a molecular axis is aligned to be 0° or −45° is called a switching angle (referring to FIG. 2B).

The compensator 13 and the FLC display device 14 of FIG. 1 are integrally formed.

FIG. 3 illustrates a table showing a switching angle with respect to a molecular axis of the compensator 13, a switching angle with respect to a molecular axis of the FLC display device 14, and transmissivity of a beam with respect to a projection lens, in the cases that the beam proceeding from the quarter wavelength plate 12 to the PBS 11 reflects from the PBS 11 and then proceeds to the projection lens (the white state), and transmits through the PBS 11 to then not proceed to the projection lens (the black state).

In FIG. 3, in the white state, each molecular axis of the compensator 13 and the FLC display device 14 is aligned to have a switching angle of 0° and 0° or +45° and −45°. Here, the transmissivity of the beam with respect to the projection lens is substantially 100%. Meanwhile, in the black state, each molecular axis of the compensator 13 and the FLC display device 14 is aligned to have a switching angle of 0° and −45° or +45° and 0°. Here, the transmissivity of the beam with respect to the projection lens has a small value.

However, since the beam transmitted from the quarter wavelength plate 12 transmits through the PBS 11 but does not proceed to the projection lens in the black state, the transmissivity of the beam with respect to the projection lens should be substantially 0%. However, as shown in FIG. 3, it can be seen that the transmissivity is not 0% in the black state.

Also, in order to maintain the transmissivity to be 0% in the black state, an angle of 90° should be formed between the molecular axis of the compensator 13 and that of the FLC display device 14. However, as can be seen from FIG. 3, an angle of 135° or 45° is formed between the molecular axis of the compensator 13 and that of the FLC display device 14. Thus, the reflective display apparatus has a problem where a contrast ratio is lowered due to the luminance of a small amount of the beam transmitted through the projection lens in the black state.

SUMMARY OF THE INVENTION

To solve the above problems, it is an object of the present invention to provide a reflective display apparatus enhancing a contrast ratio by adjusting a switching angle with respect to each molecular axis of a compensator and an FLC display device to thereby make transmissivity of a beam with respect to a projection lens in the black state substantially 0%.

To accomplish the above object of the present invention, there is provided a reflective display apparatus comprising: a polarizing beam splitter (PBS) transmitting a P polarized beam of an incident beam and reflecting an S polarized beam thereof; a compensator for converting the incident beam from the PBS into a polarized beam and then transmitting the polarized beam, and converting a beam returning after the polarized beam has been transmitted into a polarized beam and proceeding to the PBS, in which a molecular axis of each pixel is aligned in any one direction among ±α° directions based on the vertical axis when a driving voltage is applied; and a reflective liquid crystal display device for converting the incident beam after transmitting through the compensator into a polarized beam and then reflecting the polarized beam, and converting the reflected beam into a polarized beam and proceeding to the compensator, where a molecular axis of each pixel is aligned in any one direction among ±β° directions based on the horizontal axis when a driving voltage is applied, wherein an angle between the molecular axis of the compensator and that of the reflective liquid crystal display device is formed as 90° in the case that the beam transmitting through the compensator and proceeding to the PBS transmits through the PBS, thereby enhancing a contrast ratio.

BRIEF DESCRIPTION OF THE DRAWINGS

The above object and other advantages of the present invention will become more apparent by describing the preferred embodiment thereof in more detail with reference to the accompanying drawings in which.

DETAILED DESCRIPTION OF THE INVENTION

A preferred embodiment of the present invention will be described with reference to the accompanying drawings.

Figure 1:
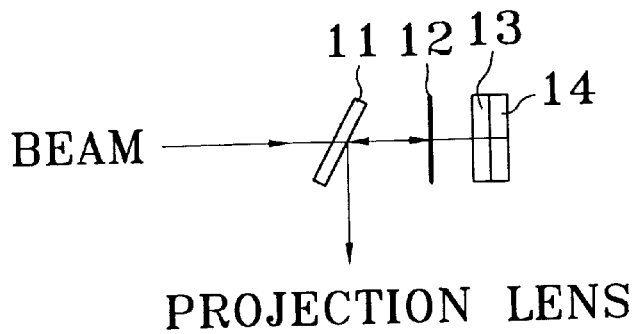
FIG. 1 is a schematic diagram showing a configuration of a conventional reflective display apparatus using a PBS.
Figure 2A:
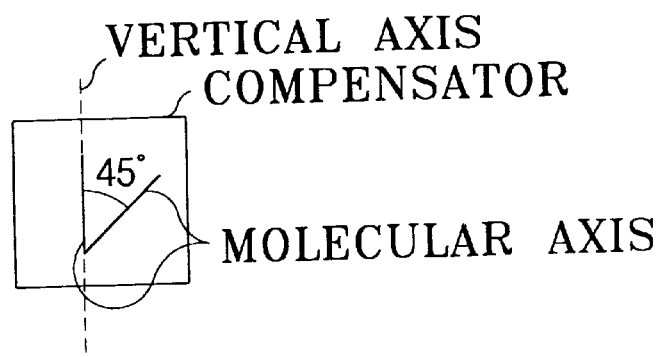
FIGS. 2A and 2B are views for explaining a switching angle with respect to each molecular axis of the compensator and the FLC display device shown in FIG. 1, respectively.
Figure 2B:
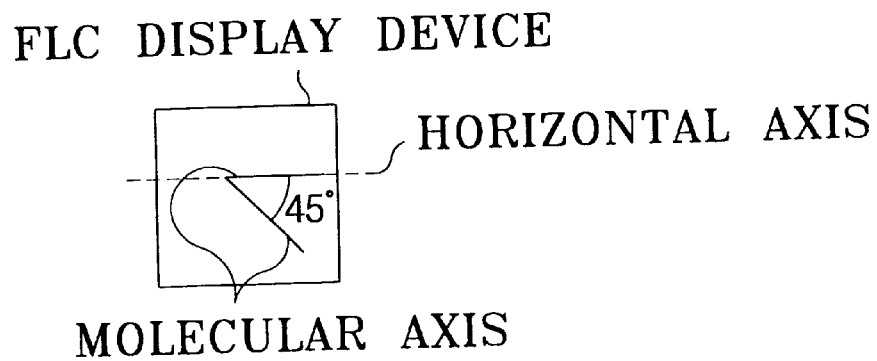
Figure 3:
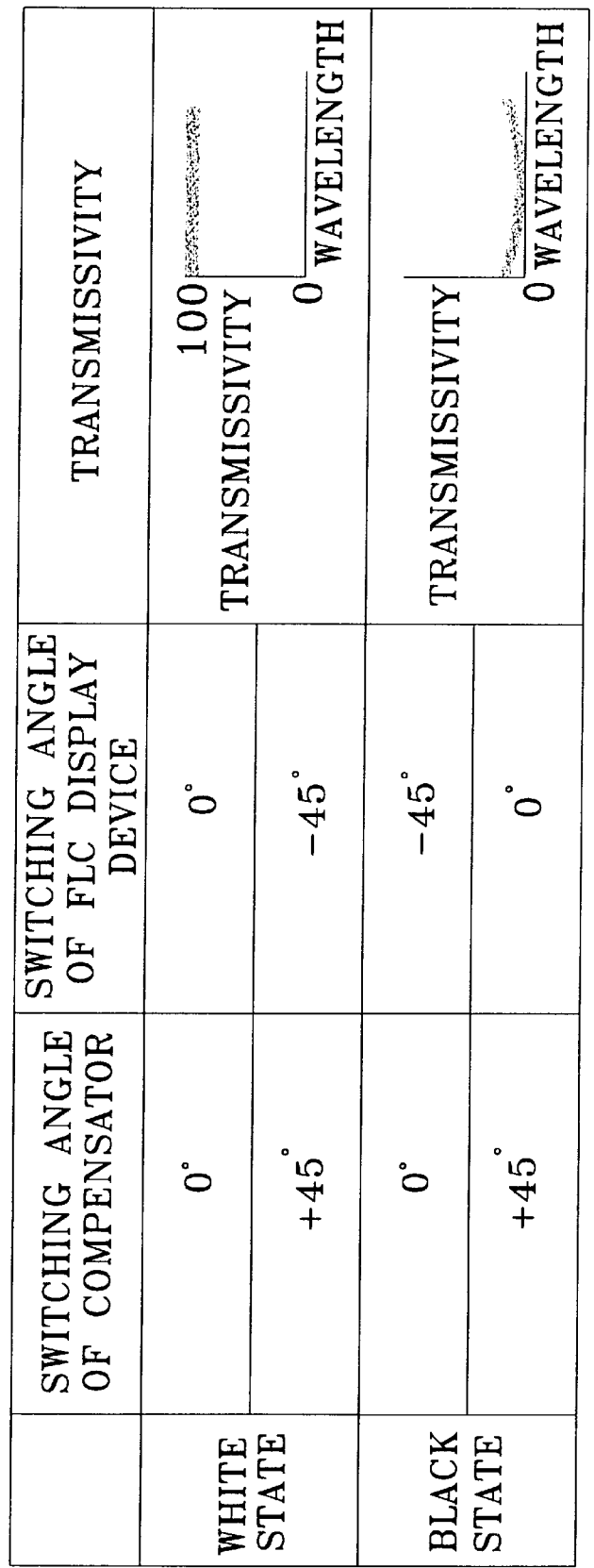
FIG. 3 illustrates a beam transmissivity with respect to a projection lens in the cases of a white state and a black state in the FIG. 1 apparatus.
Figure 4:
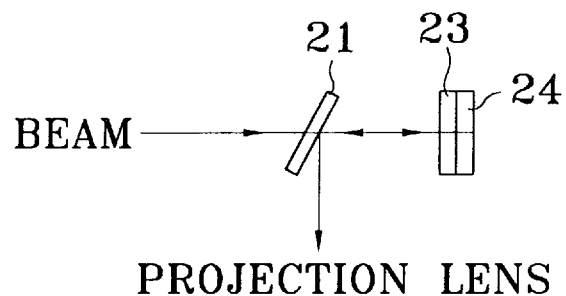
FIG. 4 is a schematic diagram showing a configuration of a reflective display apparatus using a PBS according to the present invention.

In FIG. 4 showing a configuration of a reflective display apparatus using a PBS according to the present invention, a quarter wavelength plate in the reflective display apparatus shown in FIG. 1 is excluded.

In FIG. 4, a P polarized beam of a beam incident to a polarizing beam splitter (PBS) 21 transmits through the PBS 21 and an S polarized beam reflects from the PBS 21. The beam having transmitted through the PBS 21 proceeds to a compensator 23. The beam having proceeded to the compensator 23 is converted into a circular polarized beam in the compensator 23 and then proceeds to a FLC display device 24. The beam incident to the FLC display device 24 is converted into a linear polarized beam in the FLC display device 24 and then reflected from the FLC display device 24. The reflected beam is converted into a circular polarized beam in the FLC display device 24 and proceeds to the compensator 23. The beam having proceeded to the compensator 23 is converted into a linear polarized beam in the compensator 23 and then proceeds to the PBS 21. In the beam proceeding from the compensator 23 to the PBS 21, a P polarized beam transmits through the PBS 21 and an S polarized beam reflects from the PBS 21 to proceed to a projection lens.

Figure 5A:
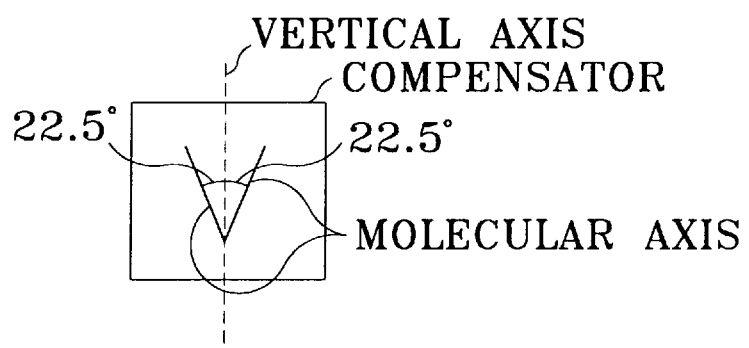
FIGS. 5A and 5B are views for explaining a switching angle with respect to each molecular axis of the compensator and the FLC display device shown in FIG. 4, respectively.

Here, the compensator 23 is made of the same material as that of the FLC display device 24. The compensator 23 converts the polarized beam of the incident beam. The molecular axis of each pixel of the compensator 23 is aligned in the disorder state when a driving voltage is not applied thereto. The molecular axis of each pixel of the compensator 23 is aligned in any one direction of −22.5° direction and +22.5° direction based on a vertical axis according to an applied driving voltage. An angle where a molecular axis is aligned to be −22.5° or +22.5° is called a switching angle (referring to FIG. 5A). The present invention illustrates only the case where a switching angle with respect to the molecular axis of the compensator 23 is ±22.5°, in which an absolute value of the switching angle satisfies an inequality 0<absolute value of switching angle ≦22.5.

Figure 5B:
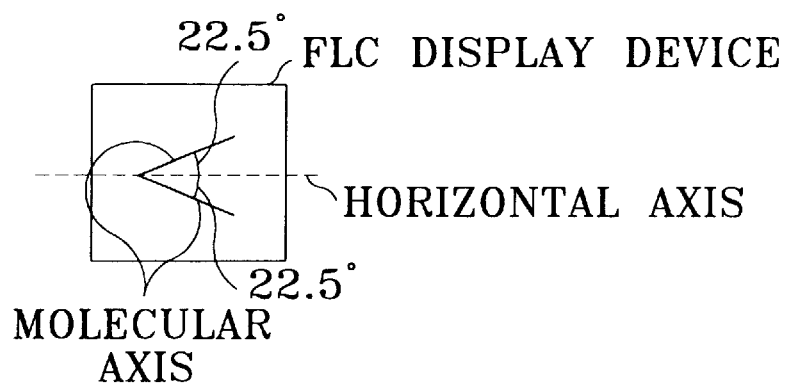

In FIG. 4, the FLC display device 24 is a reflective liquid crystal device and converts a polarized beam of the incident beam. The molecular axis of each pixel of the FLC display device 24 is aligned in the disorder state when a driving voltage is not applied thereto. The molecular axis of each pixel of the FLC display device 24 is aligned in any one direction of +22.5° direction and −22.5° direction based on a horizontal axis according to an applied driving voltage. An angle where a molecular axis is aligned to be +22.5° or −22.5° is called a switching angle (referring to FIG. 5B). The present invention illustrates only the case where a switching angle with respect to the molecular axis of the FLC display device 24 is ±22.5°, in which an absolute value of the switching angle satisfies an inequality 0<absolute value of switching angle ≦22.5.

Here, the switching angle absolute value of the compensator 23 and that of the FLC display device 24 are established as the same value. That is, if the switching angle absolute value of the compensator 23 is five, that of the FLC display device 24 is established as five.

The compensator 23 and the FLC display device 24 of FIG. 4 are integrally formed.

Figure 6:
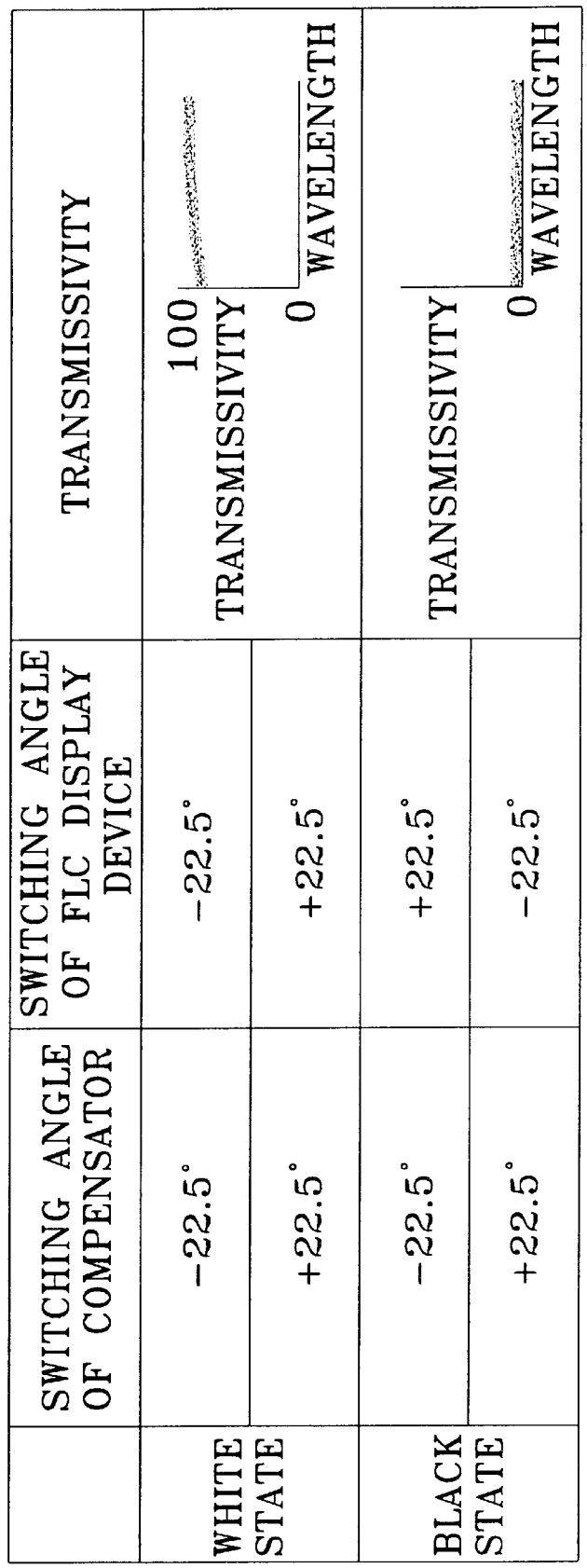
FIG. 6 illustrates a beam transmissivity with respect to a projection lens in the cases of a white state and a black state in the FIG. 4 apparatus.

FIG. 6 illustrates a table showing a switching angle with respect to a molecular axis of the compensator 23, a switching angle with respect to a molecular axis of the FLC display device 24, and transmissivity of a beam with respect to a projection lens, in the cases where the beam proceeding from the compensator 23 to the PBS 21 reflects from the PBS 21 and then proceeds to the projection lens (the white state), and transmits through the PBS 21 to then not proceed to the projection lens (the black state).

In FIG. 6, in the white state, each molecular axis of the compensator 23 and the FLC display device 24 is aligned to have a switching angle of −22.5° and −22.5° or +22.5° and +22.5°. Here, the transmissivity of the beam with respect to the projection lens is substantially 100%. Meanwhile, in the black state, each molecular axis of the compensator 23 and the FLC display device 24 is aligned to have a switching angle of −22.5° and +22.5° or +22.5° and −22.5°. It can be seen that an angle of 90° is formed between the molecular axis of the compensator 23 and that of the FLC display device 24. Thus, it can be seen that the transmissivity of the beam with respect to the projection lens is substantially 0% in the black state.

As described above, the reflective display apparatus according to the present invention adjusts a switching angle with respect to each molecular axis of the compensator and the FLC display device 24, except for the quarter wavelength plate, to maintain the transmissivity of the beam with respect to the projection lens to be substantially 0% in the black state. Thus, the reflective display apparatus according to the present invention does not substantially influence a contrast ratio with the luminance in the black state. Therefore, the reflective display apparatus according to the present invention has a higher contrast ratio to thereby enable a clearer image to be displayed.

The reflective display apparatus according to the present invention is used for manufacturing an FLC projection TV using a PBS.

What is claimed is:

1. A reflective display apparatus comprising:
   a polarizing beam splitter (PBS) adapted to transmit a P polarized beam of an incident beam and to reflect an S polarized beam thereof;
   a compensator which converts the incident beam from the PBS into a polarized beam and then transmits the polarized beam, and converts a beam returning after the polarized beam has been transmitted into a polarized beam and proceeds to the PBS, in which a molecular axis of each pixel is aligned in any one direction among $\pm\alpha°$ directions based on a vertical axis when a driving voltage is applied; and
   a reflective liquid crystal display device which converts the incident beam after the beam is transmitted through the compensator into a polarized beam and then reflects the polarized beam, and which converts the reflected beam into a polarized beam and proceeds to the compensator, in which a molecular axis of each pixel is aligned in any one direction among $\pm\beta°$ directions based on a horizontal axis when a driving voltage is applied,
   wherein an angle between the molecular axis of the compensator and that of the reflective liquid crystal display device is formed as 90° in a case where the beam transmits through the compensator and proceeds to the PBS, and transmits through the PBS, thereby enhancing a contrast ratio.

2. The reflective display apparatus enhancing a contrast ratio of claim 1, wherein said direction $\alpha$ satisfies an inequality $0<\alpha\leq22.5$.

3. The reflective display apparatus enhancing a contrast ratio of claim 1, wherein said direction $\beta$ satisfies an inequality $0=\beta\leq22.5$.

4. The reflective display apparatus enhancing a contrast ratio of claim 1, wherein said direction $\alpha$ and direction $\beta$ are of an identical value.

5. The reflective display apparatus according to claim 1, wherein said reflective liquid crystal display device is a ferroelectric liquid crystal (FLC) display device.

6. The reflective display apparatus enhancing a contrast ratio of claim 1, wherein the compensator and the reflective liquid crystal display device are integrally formed.

7. The reflective display apparatus enhancing a contrast ratio of claim 1, further comprising a projection lens, wherein the beam either one of proceeds from the compensator to the PBS, is reflected from the PBS, and then proceeds to the projection lens, in a white state, and proceeds from the compensator to the PBS, is transmitted through the PBS, to then not proceed to the projection lens, in a black state, and wherein a transmissivity of the beam with respect to the projection lens, is substantially 100% in said white state, and substantially 0% in said black state.

* * * * *